United States Patent
Guyomard et al.

(10) Patent No.: US 6,273,496 B1
(45) Date of Patent: Aug. 14, 2001

(54) OVERMOULDED METAL/PLASTIC COMPOSITE FRONT PANEL FOR MOTOR VEHICLE

(75) Inventors: Jean-Nicolas Guyomard, Le Mesnil Fuguet; Jacques Sigonneau, Theuvy Acheres, both of (FR)

(73) Assignee: Valeo Thermique Moteur, LaVerriere Cedex (FR)

( * ) Notice: Subject to any disclaimer, the term of this patent is extended or adjusted under 35 U.S.C. 154(b) by 0 days.

(21) Appl. No.: 09/555,464

(22) PCT Filed: Sep. 28, 1999

(86) PCT No.: PCT/FR99/02305

§ 371 Date: May 30, 2000

§ 102(e) Date: May 30, 2000

(87) PCT Pub. No.: WO00/18636

PCT Pub. Date: Apr. 6, 2000

(30) Foreign Application Priority Data

Sep. 30, 1998 (FR) .................................................. 98 12230

(51) Int. Cl.$^7$ ...................................................... B60J 7/00
(52) U.S. Cl. .......................................... 296/194; 296/901
(58) Field of Search ..................... 296/194, 196, 296/197, 203.02, 901

(56) References Cited

U.S. PATENT DOCUMENTS

| | | | |
|---|---|---|---|
| 4,973,102 | * | 11/1990 | Bien ....................................... 296/901 |
| 4,976,490 | * | 12/1990 | Gentle ..................................... 296/901 |
| 5,000,990 | * | 3/1991 | Freeman ................................. 296/901 |
| 5,234,246 | * | 8/1993 | Henigue et al. ....................... 296/194 |
| 5,429,412 | * | 7/1995 | Schoen et al. ......................... 296/901 |
| 5,575,526 | * | 11/1996 | Wyceeh ................................. 296/194 |
| 5,580,122 | * | 12/1996 | Muehlhausen ........................ 296/194 |
| 5,658,041 | * | 8/1997 | Girardot et al. ....................... 296/194 |
| 5,762,395 | * | 6/1998 | Merrifield et al. .................... 296/901 |
| 5,975,625 | * | 11/1999 | Simplicean ............................ 296/901 |

FOREIGN PATENT DOCUMENTS 0 658 470   6/1995 (EP) .
2 761 331   10/1998 (FR) .

OTHER PUBLICATIONS

International Search Report dated Jan. 19, 2000.

\* cited by examiner

*Primary Examiner*—Joseph D. Pape
*Assistant Examiner*—Kiran B. Patel
(74) *Attorney, Agent, or Firm*—Morgan & Finnegan, LLP

(57) ABSTRACT

The invention concerns a front panel comprising a top metal section extending over the whole width of the panel and provided with holes for fixing it to the motor vehicle structural elements, and a metal support provided with a hole for fixing it to other structural elements or fittings of the vehicle. The section and the support are separate parts, mechanically interlocked by a plastic material jointly over-moulded on the section and the support. Said structure enables in particular the use of sections with closed cross section, such as extruded or hydroformed sections. The support consists in particular of a center jamb including a hole for being fixed to a hood lock and to a cowl beam of the vehicle.

16 Claims, 1 Drawing Sheet

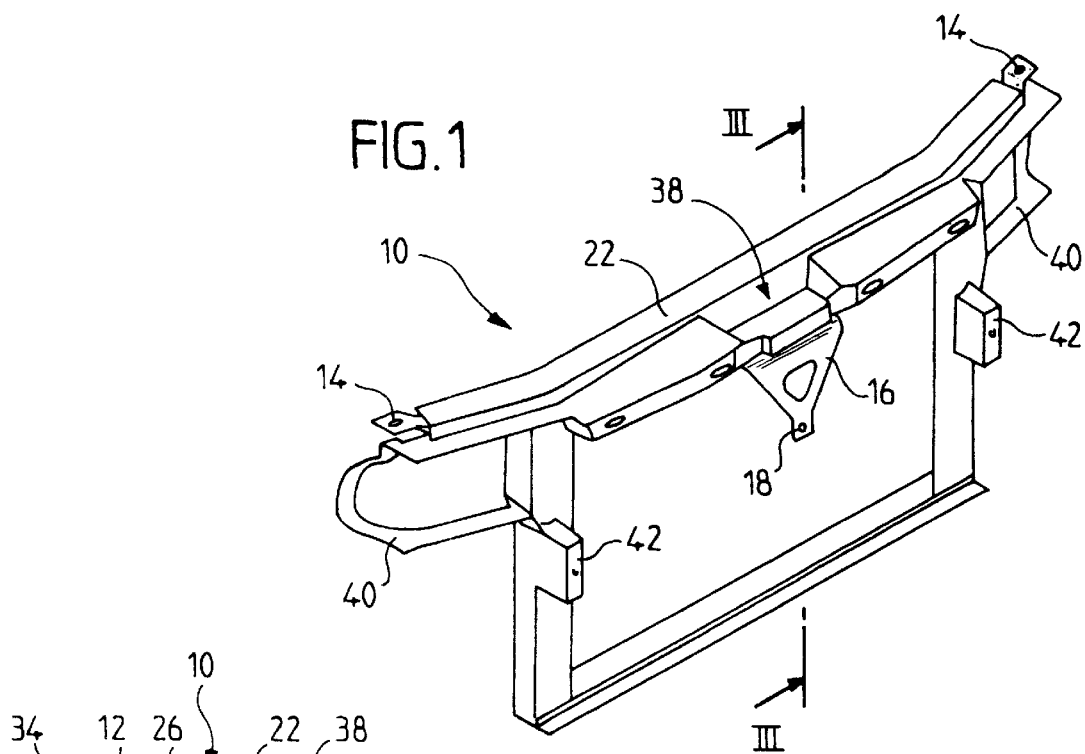
FIG.1
FIG.2
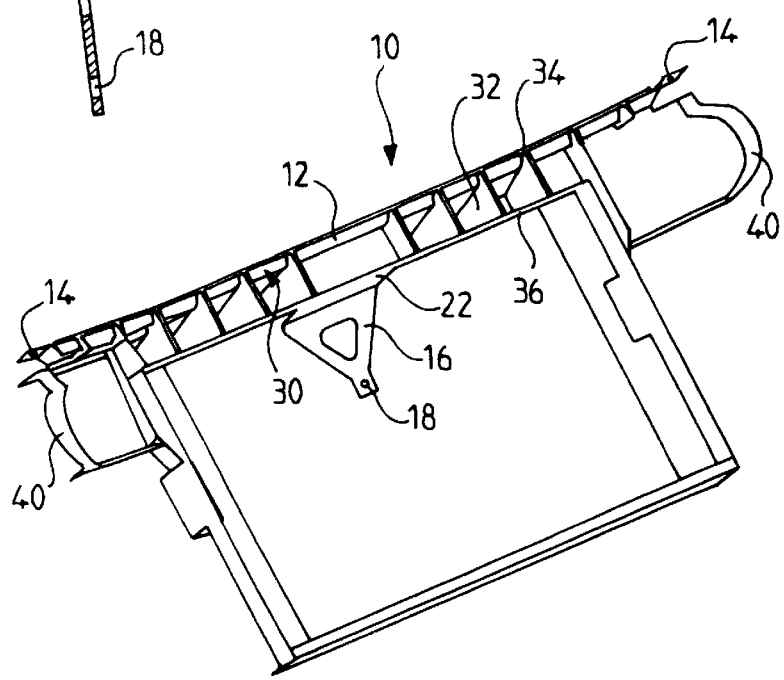
FIG.3

OVERMOULDED METAL/PLASTIC COMPOSITE FRONT PANEL FOR MOTOR VEHICLE

BACKGROUND OF THE INVENTION

The present invention relates to a metal/plastic composite front panel for a motor vehicle.

Such a front panel is a structural element of the vehicle which is capable of incorporating the various items of equipment of the vehicle, such as headlamps, direction indicators, horn, heat exchanger, electric fan unit or entire cooling module, etc.

The front panel, provided in this manner these items of equipment, forms a single-unit assembly prepared and delivered by the equipment supplier, which is ready to be mounted on the vehicle by the manufacturer.

The mounting of this module is performed by connection to lateral structural elements of the vehicle, such as side members, wings or body-frame, then positioning a bumper or front shield mounted on the module.

As a panel structure which is made entirely of plastic material does not enable compliance with the safety requirements of crash tests, for the structure of the front panel it is necessary to combine elements made of plastic material (for lightness and low manufacturing cost) and metal elements (for mechanical strength). The method presently in use consists of deep-drawing a metal sheet and mounting it on a plastic support by screwing or rivetting fixing sleeves.

However, the deep-drawing of a simple sheet does not allow the production of a part having a closed cross-section, which can ensure sufficient mechanical strength. It is therefore necessary to increase the cross-section of the sheet (making deep-drawing difficult) or to add a second sheet to close the first.

Moreover, once the sheet is mounted, it is necessary to join it to the plastic support, which accordingly adversely affects the manufacturing cost of the panel. Moreover, the punctiform connection of the sheet to the plastic support may create zones which are locally more fragile, to the detriment of the service life of the front panel.

BRIEF SUMMARY OF THE INVENTION

One of the objects of the invention is to remove this drawback, by proposing a front panel structure that is both made lighter and reinforced, and which, moreover, may be produced according to the simplest and most economical possible process.

The front panel of the invention is a composite panel of the known type comprising a top metal section extending over the whole width of the panel and provided with means for fixing it to structural elements of the vehicle, as well as at least one metal support provided with means for fixing it to other structural elements or to items of equipment of the vehicle.

According to the invention, the section and the support are separate pieces, mechanically interlocked by a plastic material jointly overmouled on the section and the support.

The section is very advantageously a section with a closed cross-section, for example extruded or hydroformed.

In cross section it may be partially overmoulded with a conspicuous region on the inner side of the vehicle. It may also receive a bundle of electric cables and/or a cable for mechanically controlling a bonnet lock, or even comprise means for fixing to items of equipment of the vehicle.

The support is very advantageously a central jamb comprising means for fixing to a bonnet lock, on the one hand, and to a shield beam of the vehicle, on the other hand. The plastic material may then be formed so as to provide a seat for the bonnet lock.

BRIEF DESCRIPTION OF THE DRAWINGS

Other characteristics and advantages of the invention will become more apparent from the detailed description of an exemplified embodiment below, given by reference to the attached drawings.

FIG. 1 represents a front panel according to the invention represented in a front perspective view.

FIG. 2 represents the panel of FIG. 1, in a rear perspective view.

FIG. 3 is a section through a vertical plane along III—III of FIG. 1.

DETAILED DESCRIPTION OF THE INVENTION

On the figures, the reference 10 generally designates the front panel according to the invention, which essentially comprises a transversal metal section 12 extending over the whole width of this panel and provided at its ends with holes 14 for fixing it to side members or wings of the vehicle, so as to ensure the mechanical strength of the frame of the latter. These ends are machined or deformed to be adapted to the fixing devices on the vehicle.

This section is advantageously a section having a closed cross section, for example produced by extrusion or hydroforming according to methods that are conventional in themselves. The closed cross section produces greatly increased rigidity in comparison with a section having an open cross section.

The panel also comprises another metal element, i.e. a central jamb 16 comprising at its lower free end a hole 18 for fixing to the beam of the shield or of the bumper of the vehicle. At its other end the jamb 16 is provided with a hole 20 intended to cooperate with the lock of the hood of the vehicle, with the bonnet closed the jamb 16 thus ensuring the mechanical connection between the bonnet and the shield to contribute to the overall rigidification of the structure of the vehicle.

The remainder of the panel is made from a suitable thermosetting or thermoplastic synthetic material, for example a glass-fibre reinforced polyamide (of course this choice is in no way restrictive) injection-moulded under pressure.

In a manner characteristic of the invention, the metal elements of the front panel, i.e. the section 12 and the jamb 16, are separate parts which are joined and interlocked by the plastic material 22, directly during the moulding operation of the panel.

In this manner, the metallic parts are connected to one another by the plastic material (at 24 on FIG. 3), without it being necessary to previously join them by screwed or rivetted joint, by welding etc, since the metallic parts are directly overmoulded by the plastic material. Thus this assembly stage is spared on the production line.

For the overmoulding, one may use, for example, the method for producing a composite metal/plastic element disclosed in EP-A-0 370 342, to which reference can be made for further details on the assembly of the overmoulding and the materials that can be used for this purpose.

The metal elements 12 and 16 are partially embedded in the plastic material, as at 26 and 28 of FIG. 3, to permit their interlocking. Certain parts, in particular of the section, may be left conspicuous, as at 30, the section then being visible from the rear (FIG. 2) when the bonnet is open.

The section may also allow the passage or attachment of electric cables or cable for controlling the bonnet lock.

In addition to the mechanical interlocking of the metal elements, the overmoulding allows ribs 32, for example, extending between wings 34, 36 to be formed, to increase overall rigidity, and also to provide a seat 38 for the bonnet lock (which will come to hook into the orifice 20 of the jamb 16).

The remainder of the panel also comprises, in a manner known per se, structural parts such as 40 which are able to receive headlamp units, or such as 42 for fixing to the beam of the shield in addition to the attachment to point 18 of the jamb 16.

As a variant or complement, the front panel may comprise other metal elements, for example lateral fastening lugs, additional jambs, etc, for example for the attachment of a cooling module 44 (FIG. 3). Here too, the metal parts are all interconnected and connected to the section by the overmoulded plastic material.

What is claimed is:

1. A composite metal/plastic panel for a motor vehicle, comprising a top metal section extending over the width of the panel and provided with means for fixing it to structural elements of the vehicle, at least one metal support provided with means for fixing to other structural elements or items of equipment of the vehicle, wherein the section and the support are separate parts, mechanically interlocked by a plastic material jointly overmoulded on the section and the support.

2. A panel according to claim 1, wherein the section has a closed cross section.

3. A front panel according to claim 1, wherein the section is an extruded or hydroformed section.

4. A front panel according to claim 1, wherein the section is partially overmoulded, in cross section, with a visible region on the inner side of the vehicle.

5. A front panel according to claim 1, wherein the section is capable of receiving a bundle of electric cables and/or a cable for the mechanical control of a bonnet lock.

6. A panel according to claim 1, wherein the section also comprises means for fixing to items of equipment of the vehicle.

7. A panel according to claim 1, wherein the support is a central jamb comprising means for fixing to a bonnet lock and to a shield beam of the vehicle.

8. A panel according to claim 7, wherein the plastic material is formed so as to provide a seat for the bonnet lock.

9. A front panel according to claim 2, wherein the section is an extruded or hydroformed section.

10. A front panel according to claim 2, wherein the section is partially overmoulded, in cross section, with a visible region on the inner side of the vehicle.

11. A front panel according to claim 3, wherein the section is partially overmoulded, in cross section, with a visible region on the inner side of the vehicle.

12. A front panel according to claim 2, wherein the section is capable of receiving a bundle of electric cables and/or a cable for the mechanical control of a bonnet lock.

13. A front panel according to claim 3, wherein the section is capable of receiving a bundle of electric cables and/or a cable for the mechanical control of a bonnet lock.

14. A front panel according to claim 4, wherein the section is capable of receiving a bundle of electric cables and/or a cable for the mechanical control of a bonnet lock.

15. A panel according to claim 5, wherein the section also comprises means for fixing to items of equipment of the vehicle.

16. A panel according to claim 6, wherein the support is a central jamb comprising means for fixing to a bonnet lock, and to a shield beam of the vehicle.

* * * * *